United States Patent
Hanechak (10) Patent No.: US 9,354,766 B2
(45) Date of Patent: May 31, 2016

(54) AUTOMATED COMPOSITE IMAGE DESIGN

(75) Inventor: Brian D. Hanechak, Waltham, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 1363 days.

(21) Appl. No.: 11/341,946

(22) Filed: Jan. 27, 2006

(65) Prior Publication Data

US 2007/0180406 A1 Aug. 2, 2007

(51) Int. Cl.
G06F 3/0481 (2013.01)
G06F 17/21 (2006.01)
G06T 11/60 (2006.01)

(52) U.S. Cl.
CPC ............ *G06F 3/0481* (2013.01); *G06F 17/211* (2013.01); *G06T 11/60* (2013.01)

(58) Field of Classification Search
USPC ............. 715/762, 837; 382/124, 15; 345/629, 345/630, 647; 358/448, 449, 540
See application file for complete search history.

(56) References Cited

U.S. PATENT DOCUMENTS

| | | | |
|---|---|---|---|
| 4,949,287 A * | 8/1990 | Yamaguchi et al. | 715/246 |
| 6,028,603 A * | 2/2000 | Wang et al. | 715/776 |
| 6,202,061 B1 * | 3/2001 | Khosla et al. | |
| 6,535,294 B1 * | 3/2003 | Arledge et al. | 358/1.15 |
| 6,826,727 B1 * | 11/2004 | Mohr et al. | 715/235 |
| 6,892,355 B2 * | 5/2005 | Britten et al. | 715/733 |
| 7,032,179 B2 * | 4/2006 | Mack et al. | 715/762 |
| 7,216,092 B1 * | 5/2007 | Weber et al. | 705/26.5 |
| 7,236,647 B2 * | 6/2007 | Lunetta et al. | 382/284 |
| 7,689,909 B1 * | 3/2010 | Szuszczewicz | 715/243 |
| 2003/0055871 A1 * | 3/2003 | Roses | 709/203 |
| 2003/0084055 A1 * | 5/2003 | Tanaka | 707/100 |
| 2003/0137545 A1 * | 7/2003 | Hoehn et al. | 345/838 |
| 2004/0022444 A1 | 2/2004 | Rhoads et al. | |
| 2004/0061900 A1 * | 4/2004 | Tanaka | 358/1.18 |
| 2004/0123247 A1 * | 6/2004 | Wachen et al. | 715/530 |
| 2004/0255245 A1 * | 12/2004 | Yamada et al. | 715/517 |
| 2005/0007469 A1 * | 1/2005 | Imamura et al. | 348/239 |
| 2005/0223320 A1 * | 10/2005 | Brintzenhofe et al. | 715/517 |
| 2006/0103667 A1 * | 5/2006 | Amit et al. | 345/619 |
| 2006/0103891 A1 * | 5/2006 | Atkins | 358/450 |

* cited by examiner

*Primary Examiner* — Phenuel Salomon
(74) *Attorney, Agent, or Firm* — Jessica Costa (57) ABSTRACT

Systems and methods for creating and using composite images are provided. An online design customization tool receives user-supplied text and automatically combines the text with a user-selected image to create horizontal and vertical composite images. The aspect ratios of the composite images are compared to the aspect ratio of an image container in an electronic product design template to determine which composite image version is appropriate. The appropriate composite image is automatically incorporated into the electronic product design template and displayed the user.

27 Claims, 11 Drawing Sheets

AUTOMATED COMPOSITE IMAGE DESIGN

FIELD OF THE INVENTION

This invention relates to the automated creation of customized composite images.

BACKGROUND OF THE INVENTION

Printing services Web sites allowing a user to access the site from the user's home or work and design a personalized document are well known and widely used by many consumers, professionals, and businesses. Typically, these types of sites allow the user to review thumbnail images of a number of customizable designs prepared by the site operator having a variety of different styles, formats, backgrounds, color schemes, fonts and designs from which the user may choose. When the user has selected a specific product template design to customize, the sites typically provide online tools allowing the user to incorporate the user's personal information and content into the selected template to create a custom document design. When the design is completed to the user's satisfaction, the user can place an order through the site for production and delivery of a desired quantity of the corresponding printed product.

Many customers of Web-based custom business product design sites are sole proprietors and small businesses who have a need for high-quality printed materials, such as business cards, letterhead, postcards, announcements, and brochures, to distribute in connection with the promotion of their service or product offerings. Many of these small office/home office customers do not have a logo to convey an identity for their business; perhaps because they are just starting in business or they do not have the time and/or financial resources to obtain a logo through traditional channels. Many design professionals provide the service of designing individual business logos, but the cost of having a professional designer craft a custom logo can be expensive and may involve devoting time to consulting with the designer and reviewing candidate logos.

"Do-it-yourself" logo design sites are also available. These sites typically allow the user, to select an image from a set of available images provided by the site operator, enter text to appear in the logo, select among available fonts and colors, and then manually click-and-drag or otherwise manipulate the relative sizes and positions of the image and the text. When the user is satisfied with the assembled logo, the user can make payment arrangements and receive the logo in electronic format.

If a user who has acquired a logo from a designer or a logo design site later wants to incorporate the logo into a printed product being designed online on a product design site, the user must typically retrieve the logo from the user's computer storage system, upload the logo to the product design site, and incorporate and position the logo in the product being designed online. In some cases, the size or aspect ratio of the user's logo may not be well suited to the product being designed, resulting in a finished product that is not completely satisfactory.

There is, therefore, a need for an automated design tool that is integrated with an online product design system and allows the user to create a composite image containing user-supplied text and incorporate the custom logo into one or more products being designed on the site.

SUMMARY

The present invention is directed at satisfying the need for automated tools facilitating the creation of customized images.

In accordance with one aspect of the invention, user-supplied text is automatically combined with a user-selected image to create horizontal and vertical composite images. The aspect ratios of the two composite arrangements are automatically calculated and compared with the aspect ratio of a composite image container to determine which of the two arrangements is preferable for that container.

It is an advantage of the invention that multiple custom composite images can be quickly and easily prepared and automatically evaluated to select the appropriate composite image for an available composite image container.

It is another advantage that that the appropriate composite image can be automatically incorporated into one or more electronic product designs.

These and other objects, features, and advantages of the invention will be better understood with reference to the accompanying drawings, description and claims.

DETAILED DESCRIPTION

Figure 1:
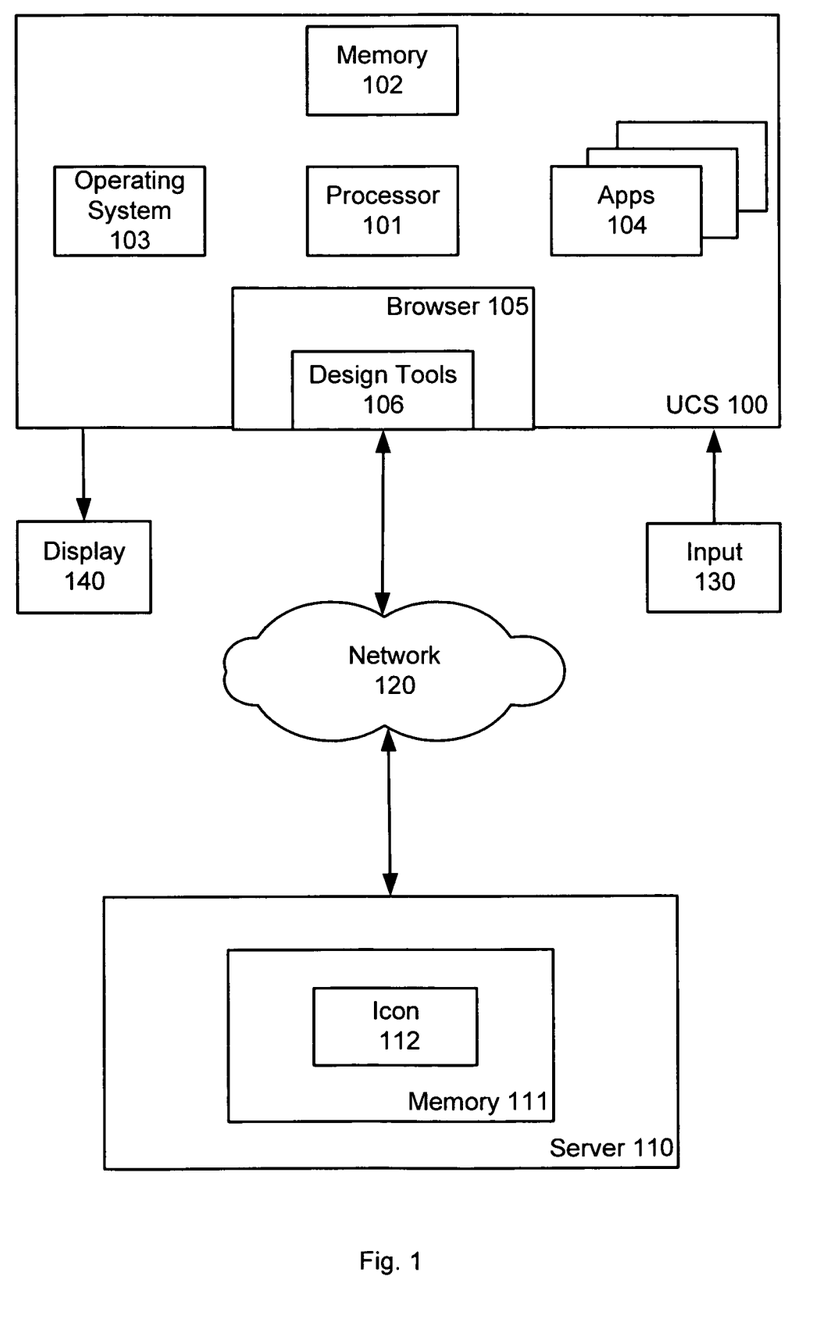
FIG. 1 depicts a representative system with which the invention may be employed.

Referring to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. UCS 100 can be a typically equipped personal computer, a portable computer, a tablet computer, or other device. The user views images from UCS 100 on display 140, such as a CRT or LCD screen, and provides inputs to UCS 100 via input devices 130, such as a keyboard and a mouse.

When UCS 100 is operating, an instance of the USC 100 operating system will be running, represented in FIG. 1 by operating system 103. In addition, the user may be running one or more application programs Apps 104. In FIG. 1, UCS 100 is running Web browser 105, such as Internet Explorer from Microsoft Corporation. In the depicted embodiment, Design Tools 106 is a product design program downloaded to UCS 100 via network 120 from remote server 110, such as downloadable design tools provided by VistaPrint Limited and publicly available at VistaPrint.com. Design tools 106 runs in browser 105 and exchanges information and instructions with server 110 during a design session to support the user's preparation of a customized product design in electronic form. When the customer is satisfied with the design of the product, the design can be uploaded to server 110 for storage and, if desired by the user, subsequent production of the desired quantity of the physical product on appropriate printing and post-print processing systems.

While server 110 is shown in FIG. 1 as a single block, it will be understood that server 110 could be multiple servers configured to communicate and operate cooperatively to support Web site operations. Server 110 will typically be interacting with many user computer systems, such as UCS 100, simultaneously. Memory 111 represents all components and subsystems that provide server data storage, such as RAM, ROM, and disk drives or arrays. Icon memory 112 represents the portion of memory 111 containing the information and images, referred to herein as "icons", provided by the service provider to enable the automated creation and rendering of a composite image combining an icon image with user-supplied text.

Design Tools 106 includes composite image design screens allowing a user to prepare a customized composite image by automatically combining user-supplied text with an icon selected by the user from the images available in Icon 112. The user is further given the option of selecting a color scheme for the composite image and a choice of fonts for the user-supplied text. For the purpose of the following discussion, an embodiment for designing a logo will be disclosed. The invention is not limited to a composite design that is used as a logo, but it will be understood from the discussion below that the invention can be readily used to prepare, and incorporate into a product design, any composite image having at least an image component and a text component. The particular location where the computations and processing described below are performed is not critical. They could be performed at Server 110 or at UCS 100 by tools downloaded from Server 110 to UCS 100 for execution in Browser 105, or a combination of both.

Figure 2:
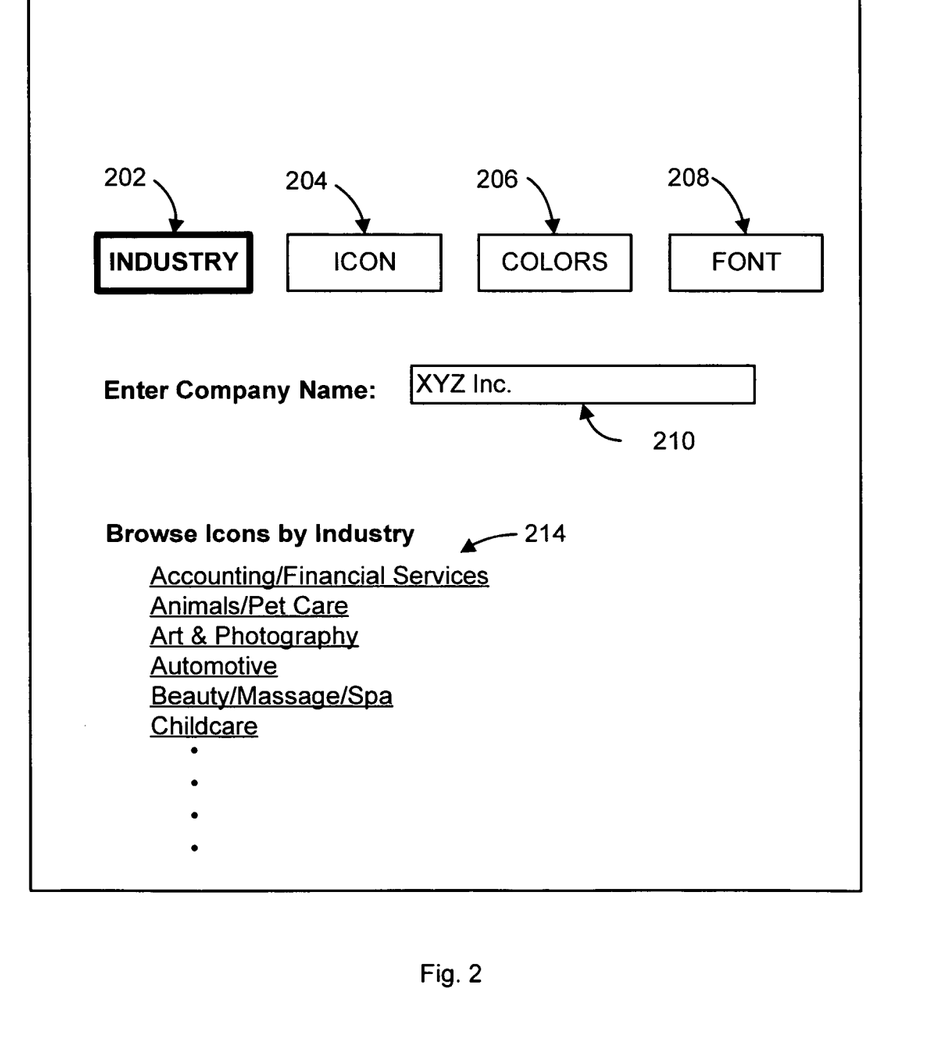
FIGS. 2-5 are representations of composite image customization screens.
Figure 3:
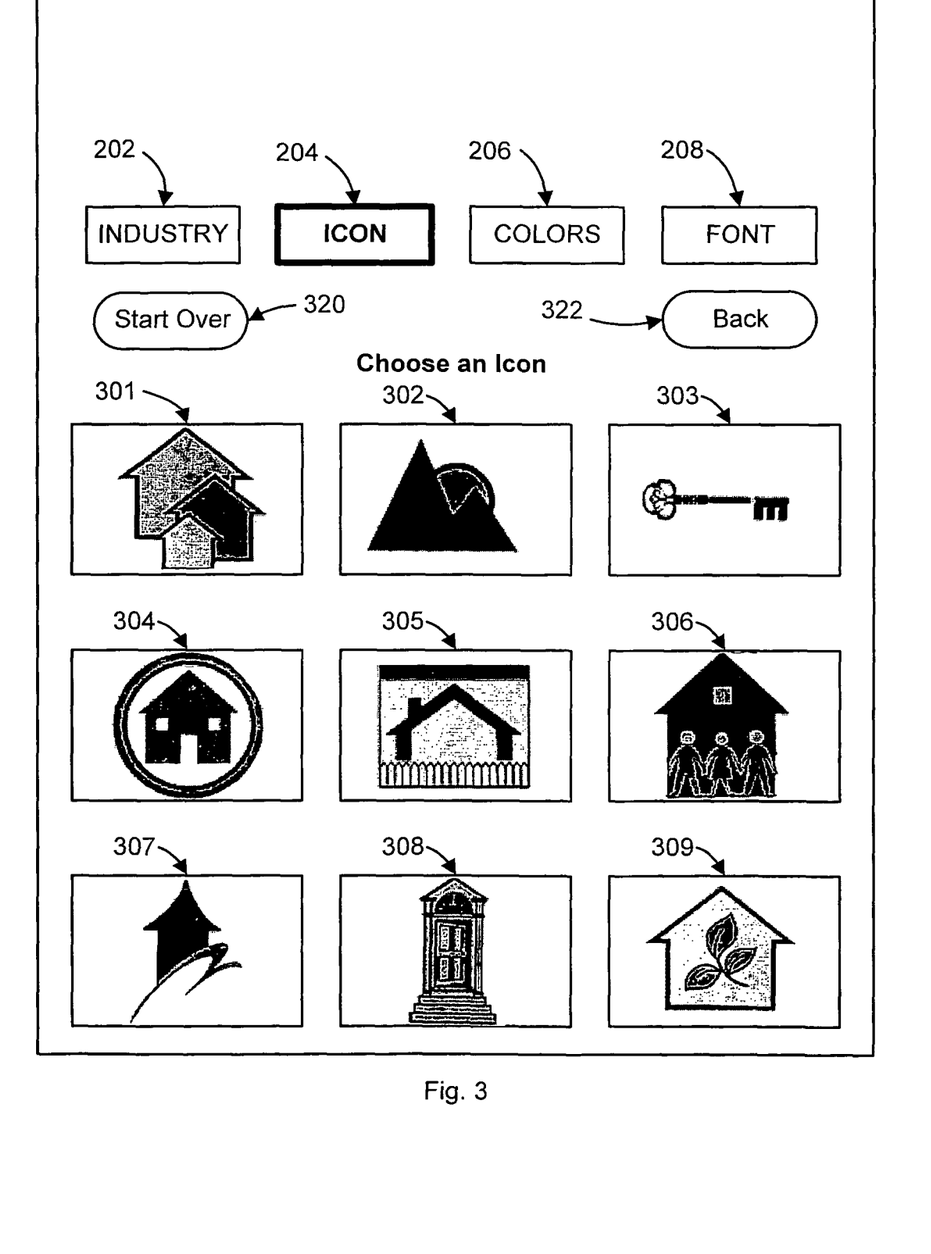
Figure 4:
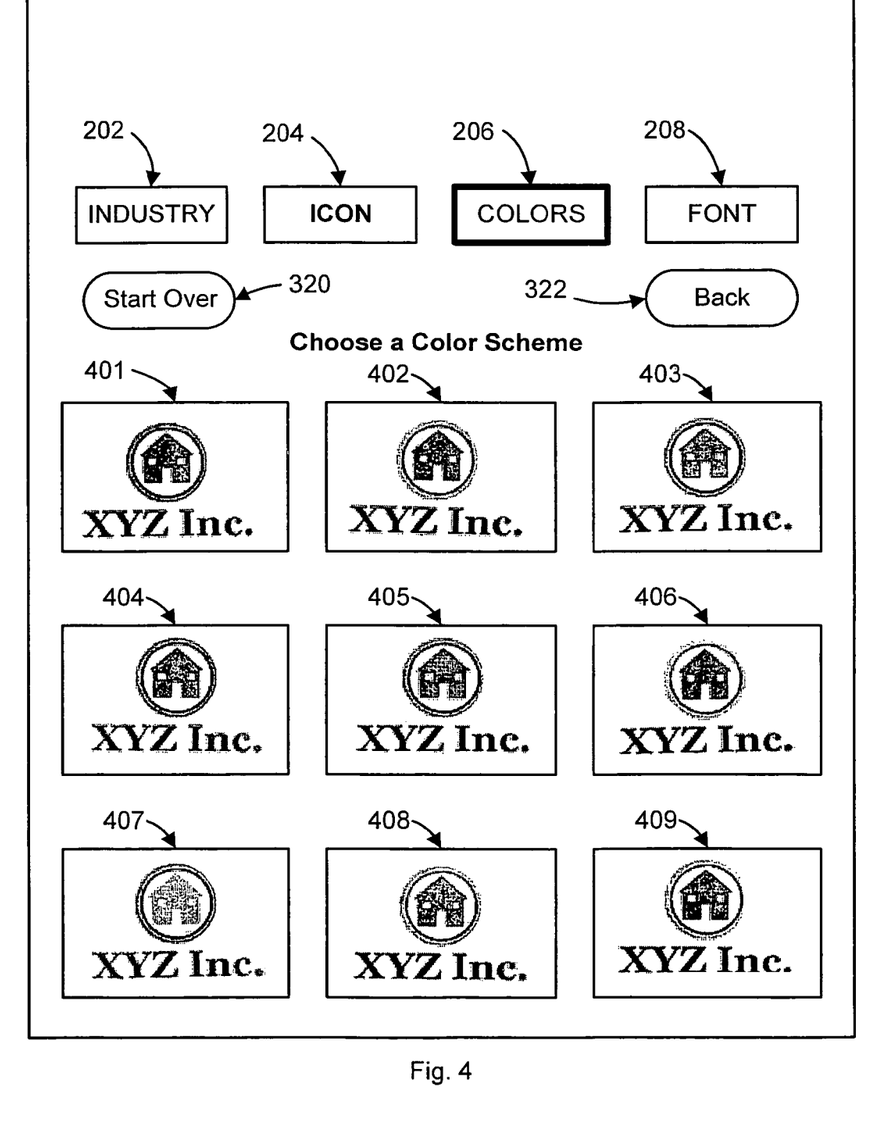
Figure 5:
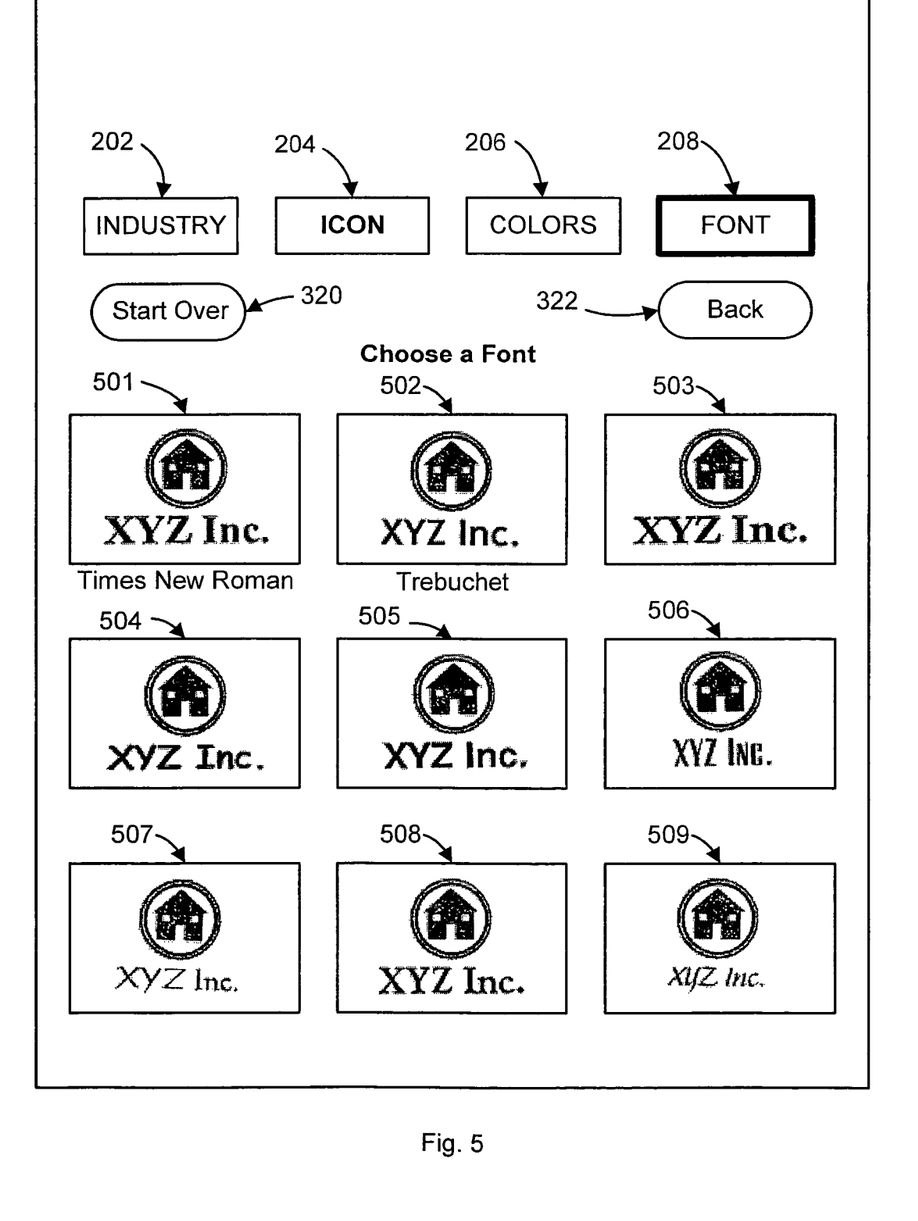

Referring now to FIGS. 2-5 and 9, an illustrative system and method for creating a customized composite image logo will be discussed. At step 902, the logo design tool is activated. Activation of the tool could be accomplished in any one of various well-known ways, such as by the user clicking a link to the tool displayed elsewhere on the site or a link incorporated in a promotional email message sent to the user. FIG. 2 is a representation of an initial logo design screen displayed to the user when the tool is activated. In the embodiment of the logo customization process described herein, the user creates a customized logo in four steps. The logo tool is designed to first present a text entry page (FIG. 2), then move to icon selection (FIG. 3), then color scheme selection (FIG. 4), and finally to font selection (FIG. 5). It will be understood that either more or fewer customization options could be offered to the user, as desired by the site provider, and the specific sequence of presenting the options to the user could be arranged differently.

Figure 9:
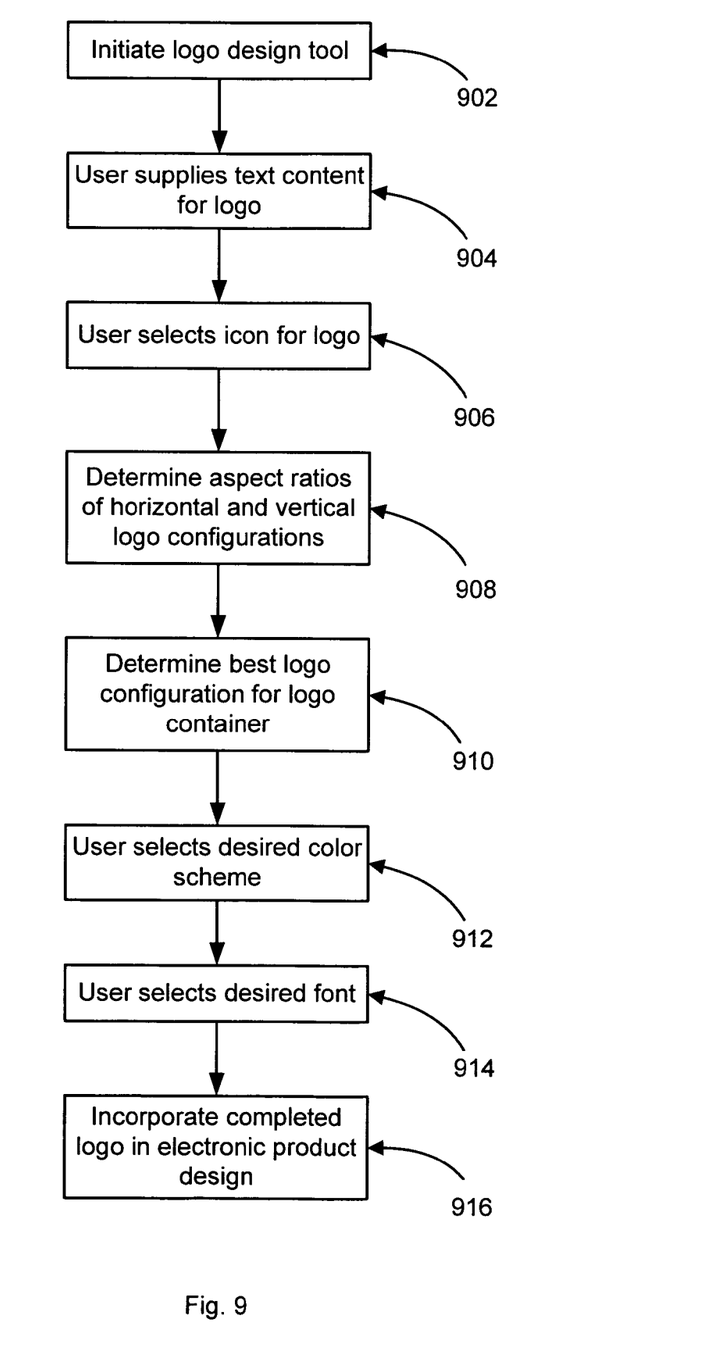
FIG. 9 is a flowchart of an embodiment of the invention.

Indicator tabs or buttons 202, 204, 206 and 208 are provided. These could be implemented as merely status indicators to provide a visual indication to the user of where the user is within the design process flow or they could also serve as active navigation controls allowing the user to select a button to override the usual design sequence and move among the customization screens in another order. In FIG. 2, button 202 is highlighted, represented in the figure by the button being shown with a bold outline, indicating to the user that the user is on the first customization step. A text entry field 210 is provided to allow the user to enter the specific character or characters the user desires to incorporate into the logo. The characters entered by the user could include letters, numbers, punctuation marks or other symbols as supported by the site operator. All characters of all types entered by the user are collectively referred to herein as "text". Typically the user will desire to enter a business name in this field, so the instructional phrase "Enter Company Name" is provided adjacent to text field 210. When initially displayed to the user, text entry field 210 will typically be empty. At step 904, the user enters whatever text the user wants to appear in the logo. In FIG. 2, for illustration purposes, the characters "XYZ Inc." are shown as having been entered by the user in field 210.

Also displayed to the user on this screen are links for assisting the user in locating a suitable icon element for the logo. The operator of the site has associated the available icons with various industries, occupations, or interests, such as Accounting/Financial Services, Animals/Pet Care, Art & Photography, and so forth, and has provided links 214 allowing the user to request to see the specific set of icons selected by the site operator as being suitable or desirable for that industry. It will be appreciated that the site operator could, if desired, provide a link to allow the user to see all available icons or have the icons categorized and searchable by other icon characteristics or attributes. The tool could also be implemented to allow the user to upload an image from the UCS 100, or another remote system, to be used as the icon image of the logo.

When the user selects one of the links 214, an icon selection screen (FIG. 3) is automatically displayed to the user. Navigation buttons Start Over 320 and Back 322 are displayed on this screen and also on the color scheme and font selection screens discussed below. Start Over 320 will take the user back to the initial screen (FIG. 2), while Back 322 will take the user back to the previous screen in the normal customization sequence.

In the example shown in FIG. 3, the user is presented with a selection of nine candidate icon images 301-309. More or fewer icons could be presented depending on how the site has been designed by the site operator and the number of icons available matching the selected industry link.

In this illustrative example, at step 906 the user selects icon 304 as the icon element for the user's customized logo. At step 908, in response to the user's selection of the icon element, for example by the user clicking on the logo image, the logo tool determines the aspect ratio of a horizontal logo arrangement and a vertical logo arrangement of the selected icon and the user's text, as will be described in more detail below. At step 910, the logo tool selects a logo arrangement for logo containers 401-409 used to display the logo color choices to the user on the color selection screen (FIG. 4). Each logo image 401-409 displays the logo selected by the user in a different color scheme for the user's review. At this stage of the normal process flow, a default font is used for the text component. As will be discussed below, because the version of the user's logo that will be incorporated into a product design is determined based on the specific aspect ratio of the target image container in the design, the version of the logo later used in a particular product design may not be the same version as displayed to the user during the customization process as logo images 401-409.

When the user selects a desired color scheme at step 912, a font selection screen (FIG. 5) is automatically displayed. Nine variations 501-509 of the user's logo are displayed for user review. The number of font options displayed is a design choice by the site operator. Each image 501-509 contains the selected icon, the selected color scheme, and the user's text rendered in a different font. The name of the font used in images 501-509 may be displayed for the user's information, such as the example font names shown below images 501 and 502.

If the user has progressed through the customization screens in the typical manner, the nine images 501-509 are finished customized logo designs. If the user is not completely satisfied with the logo, the user can use Back 322 to go back to one or more earlier customization screens to modify one or more elements of the logo or, if desired, the user can use Start Over 320 to return to the initial text entry screen (FIG. 2) to begin the process again. If the user is satisfied with the one of the images 501-509, the user can select that image as the user's logo at step 914. This selection action by the user completes the logo design process and causes a post-design screen to be automatically displayed at step 916 showing one or more possible product designs containing the user's newly prepared logo.

Figure 6A:
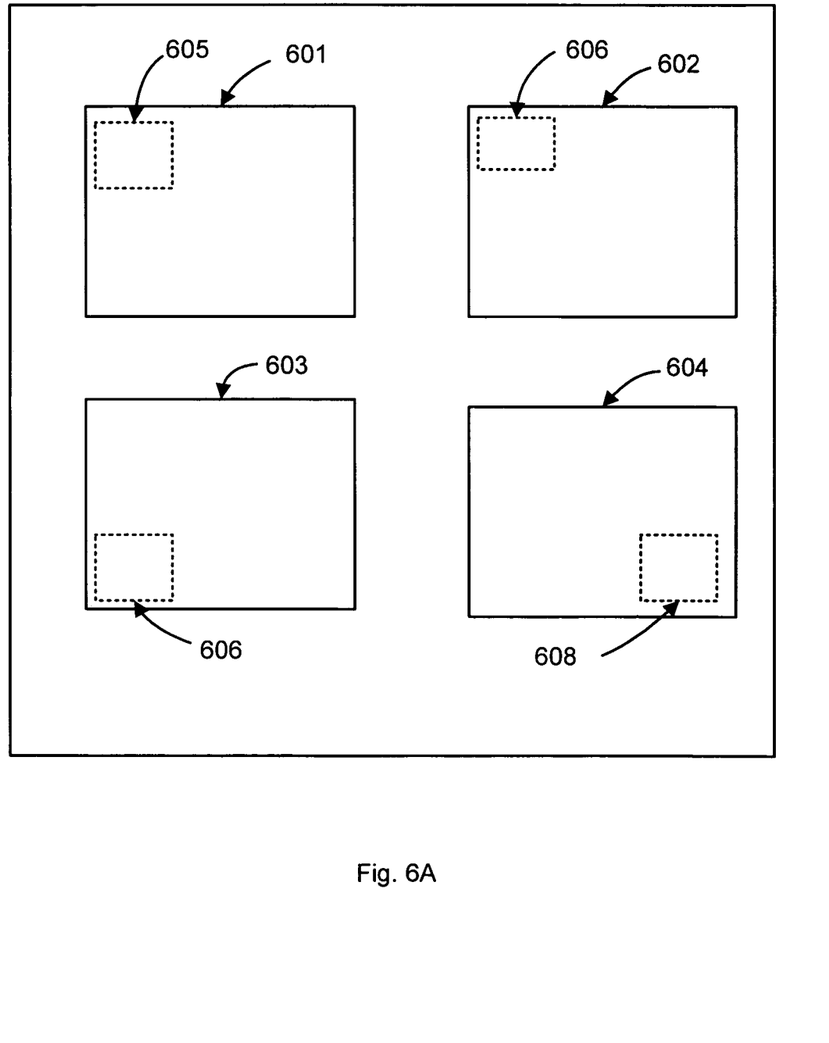
FIGS. 6A-6B depict representative product template screens incorporating the composite image.

The user's customized logo can be readily integrated into the site provider's custom product design process. For example, referring to FIG. 6A, the user could be shown a screen having a variety of product templates 601-604 available for selection and personalization by the user. Each template 601-604 would be an image of a product available through the site, such as templates for business cards, letterhead, or postcards. Each displayed template would typically include a different combination of text layout, background image, and other design elements and would have been designed by the site operator to have a logo container 605-608 for the user's logo at different locations within the template to offer the user a range of options for presenting the logo in the user's printed materials. The user's customized logo image will be automatically positioned in logo containers 605-608 when FIG. 6A is displayed to the user. If none of the initial product templates 601-604 appeal to the user, the operator of the site could allow the user to request to see more templates. When the user sees a desirable product template, the user can continue to customize the template by adding the user's name, address, or whatever other personalization content the user desires and then upload the finished electronic product design to server 110 for conversion to a suitable prepress format and production of a requested quantity of the printed product.

Figure 6B:
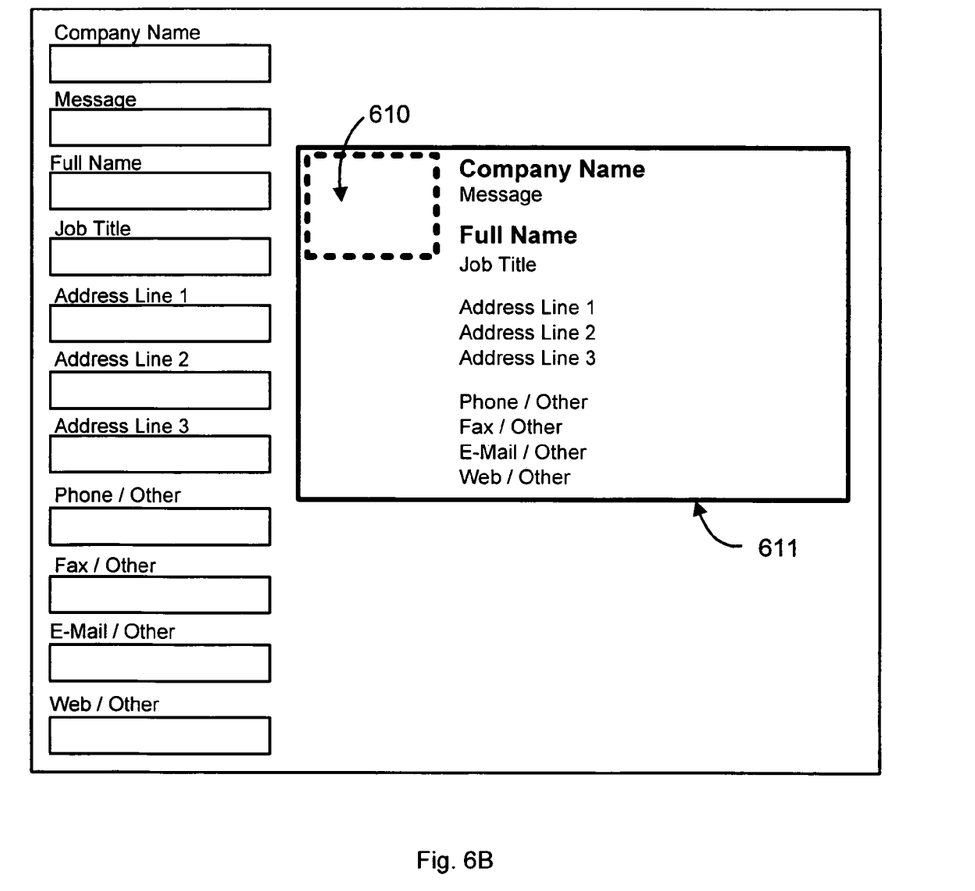

Other post-design screens could also be employed. For example, a user may have already selected a product template prior to initiating the logo design tool. In this case, the site could remember the selected template and, when the user completes the logo design process, automatically incorporate the logo into the selected template and present the user with a product customization screen (FIG. 6B) showing the previously selected template 611 automatically updated to incorporate an image 610 of the user's newly created logo.

In the disclosed embodiment, because the site operator supports logo image containers having multiple aspect ratios, the site operator treats the logo arrangement as flexible and adaptable to logo containers of different aspect ratios. In other words, the site operator determines the best logo arrangement for each logo container separately for each template displayed to the user. For example, referring again to FIG. 6A, to give the user increased choice of logo appearance, the site operator may provide different aspect ratios for logo containers 605-608. It is, therefore, possible that, because of the different aspect ratios of the logo containers, a vertical arrangement of the user's logo may be displayed to the user in one or more of the containers 605-608 while a horizontal arrangement of the logo is displayed in the other containers. Both the horizontal and vertical versions of the logo are automatically stored by the site operator for possible use by the user in the future. Alternatively, if a site operator chose, to implement a site such that all logo image containers have the identical aspect ratio, only the version of the logo best suited for that particular aspect ratio would need to be retained.

Turning now to the step of determining the aspect ratios of a logo having an icon component and a text component, in the embodiment discussed herein, two possible arrangements of the customized logo are discussed: a "vertical" arrangement, in which the icon is positioned above the text component, and a "horizontal" arrangement, in which the icon is positioned to the left of the text component. It will be clear from the discussion below that these particular relative positions are not essential to the techniques discussed.

The site operator has prepared a variety of product design layouts having an image container positioned within the template to contain the user's logo. The logo container will have a known size within the product template, and therefore, a known aspect ratio. As will be discussed in more detail below, the aspect ratios of the two possible logo arrangements are automatically calculated and compared to the aspect ratio of the logo container into which the user's logo will be placed. The logo arrangement that will yield logo components having the largest size when the logo is placed in the logo container will be automatically selected. As used herein, the aspect ratio of an element is defined as the height of the element divided by the width of the element.

Figure 7A:
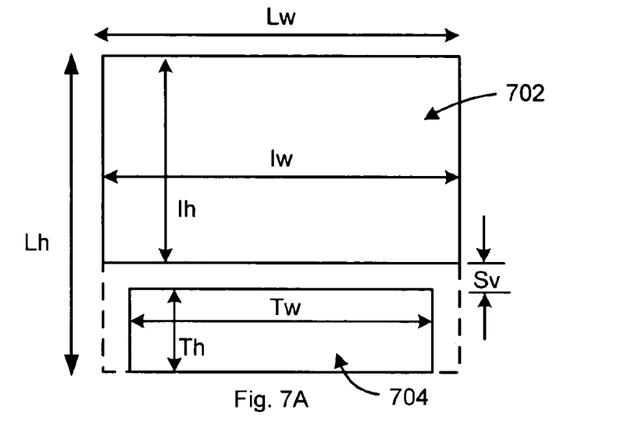
FIGS. 7A-7C depict representative arrangements of composite image components.
Figure 7B:
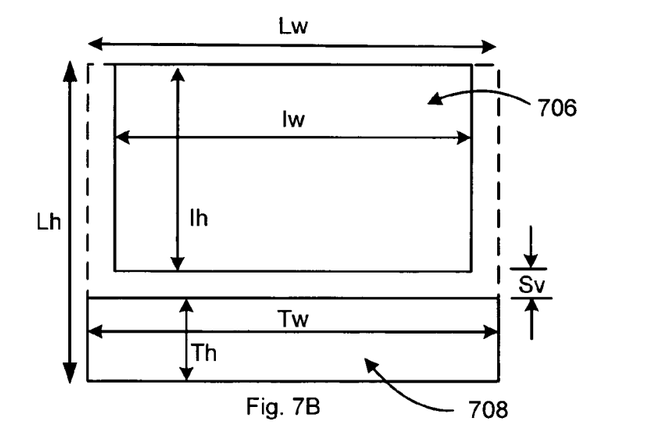
Figure 7C:
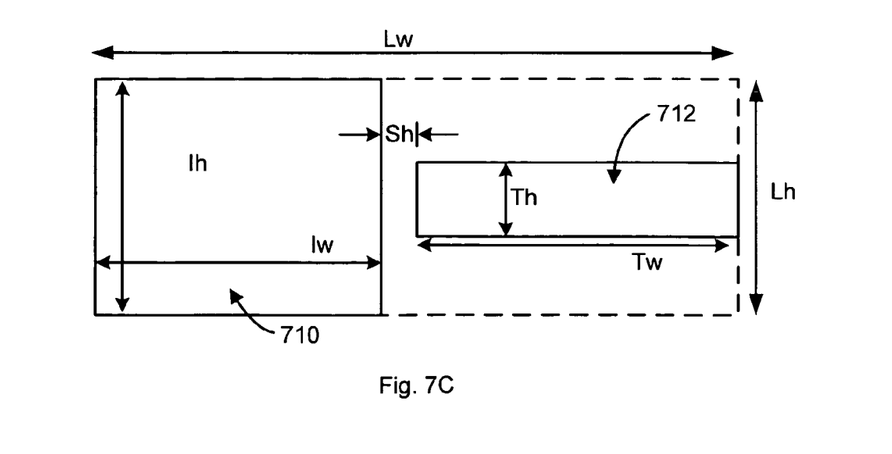
Figure 8A:
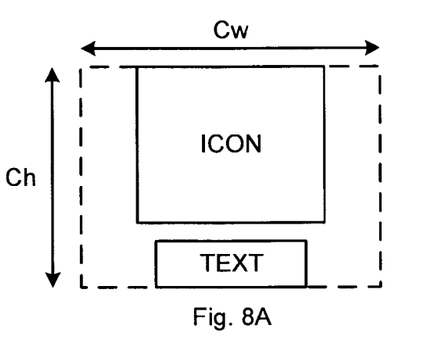
FIGS. 8A-8D depict representative composite image positions within an image container.
Figure 8B:
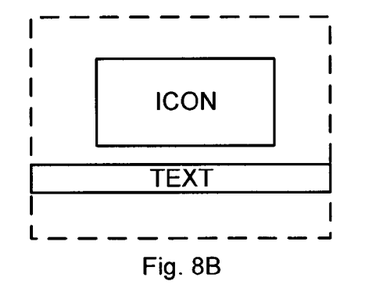
Figure 8C:
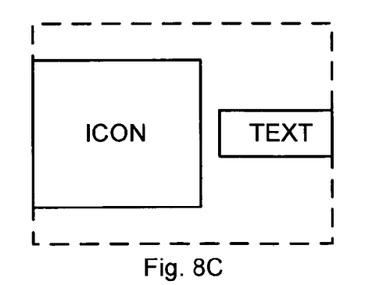
Figure 8D:
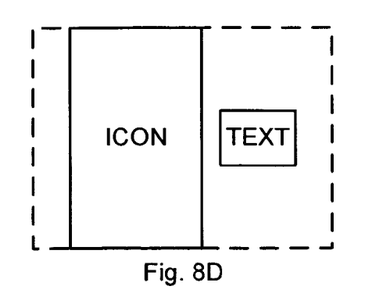

Referring to FIGS. 7A-C, three representative logo situations are depicted. The icon images and text containers described herein are rectangular areas having portions that are rendered so as to be visible to the user and portions that are transparent such that any other image "underneath" the icon or the text container remains visible in those transparent areas. FIG. 7A depicts a vertical arrangement where text container 704 and icon 702 are separated by a vertical separation distance Sv and the width of the icon Iw exceeds the text width Tw. FIG. 7B depicts another vertical arrangement where text container 708 and icon 706 are again separated by vertical separation distance Sv, but in this case the text width Tw exceeds the icon width IW. FIG. 7C depicts a horizontal arrangement where text container 712 and icon 710 are separated by horizontal separation distance Sh. Each of these composite logo arrangements has a logo aspect ratio equal to the logo height Lh divided by the logo width Lw. The goal is to identify whether the horizontal arrangement or the vertical arrangement will yield the largest logo component elements when the logo is placed in a logo container of known aspect ratio.

In the embodiment discussed herein, the relative heights of the icon and text components of the logo are constrained to have a fixed size relationship to each other. In this example, the height of the text component Th is controlled to be a constant portion of the height of the icon, for example 33%. The separation distances Sv and Sh are also implemented to have a fixed relationship to the size of the elements. For example, referring to FIG. 7A, vertical separation distance Sv could, for example, be set as 10% of the icon height. The exact proportional relationships of these elements are an aesthetic decision by the site operator. A single set of proportional rules could be applied consistently across all logos, or, if desired, could vary according to the aspect ratio of the icon selected by the user, the specific font selected, or other parameters.

Once the user has entered text in text field 210, the aspect ratio of the text component can be determined. For example, Microsoft GDI Plus tools can be used to draw the user-supplied text and then supply the resulting dimensions. As an alternate method, the dimensions of the container containing the text can be directly obtained from Browser 105. Knowing the aspect ratio of the text container, the logo aspect ratio can be determined.

Referring again to FIGS. 7A and 7B, in the case of the vertical logo arrangements, the height of the logo is the same in both cases, that is Iw+Sv+Th. The width of the logo will be the larger of the icon width Iw, as shown in FIG. 7A, or the text width Tw, as shown in FIG. 7B. The aspect ratio of the user's logo will, therefore, be the smaller of $(Ih+Sv+Th)/Iw$ or $(Ih+Sv+Th)/Tw$. Expressing these two possible aspect ratios in a different manner allows for them to be readily and automatically compared.

For the first expression, dividing all elements by icon height Ih yields $(1+Sv/Ih+Th/Ih)/Iw/Ih$ or, expressed differently, $(1+Sv/Ih+Th/Ih)*Ih/Iw$. Ih/Iw is the known aspect ratio of the icon and, as discussed above, the relationship between the vertical separation Sv, the text height Th and the icon height Ih are all fixed, therefore the values of Sv/Ih and Th/Ih are known.

For the second expression, dividing all elements by text height Th yields $(Ih/Th+Sv/Th+1)/Tw/Th$ or, expressed differently, $(Ih/Th+Sv/Th+1)*Th/Tw$. Th/Tw is the aspect ratio of the text container and the relationships between Ih, Sv, and Th again are fixed and known.

Looking now at the horizontal arrangement depicted in FIG. 7C, the width of the logo is $Iw+Sh+Tw$, therefore the aspect ratio of this logo arrangement is $Ih/(Iw+Sh+Tw)$. Expressing this in terms of ratios yields $(Ih/Th)/((Iw/Ih/Th/Ih)+(Sh/Th)+(Tw/Th))$. Tw/Th is the inverse of the aspect ratio of the text container and the relationships between the other values again are known.

The system follows the selection rule that whichever version of the logo will present the component elements of the logo in the largest size when the logo is sized to fit within in a target image container will be automatically selected and placed in that image container. Once the horizontal and vertical logo aspect ratios are calculated, both logo aspect ratios can be tested against the target logo container to determine which of the logo arrangements yields the largest logo elements. As mentioned above, the image and text component elements have a fixed size relationship to each other, therefore the sizes of only one of the component elements of the logo need to be compared to make this determination. Fitting an image having a known aspect ratio into an image container having a known aspect ratio is well known in the art.

Looking at FIGS. 8A-8D, four illustrative examples of possible logo arrangements in a logo container having height Ch and width Cw are depicted. The logo is never cropped or distorted when being placed in a logo container, therefore, unless the logo and the logo container coincidentally happen to have identical aspect ratios, the logo will not completely fill the available logo container in both dimensions. The logo will be sized to fill the logo container in one dimension and be centered within the logo container in the other dimension.

Figure 10:
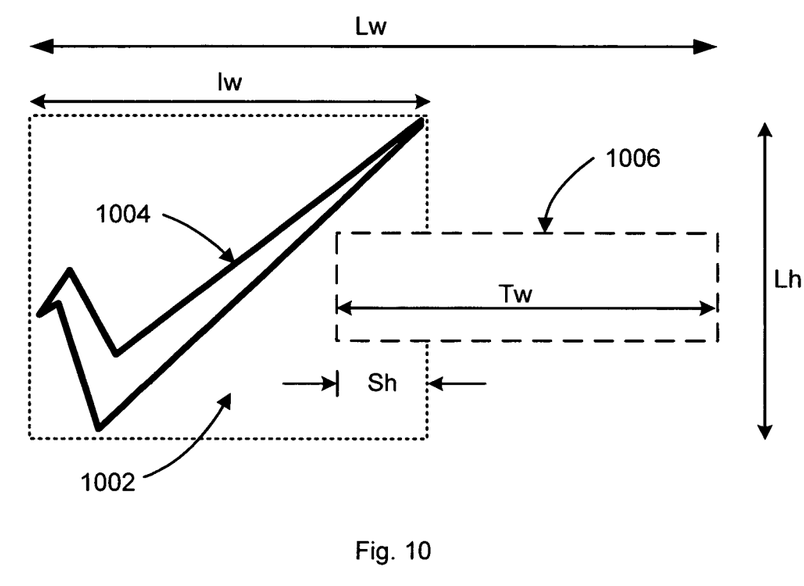
FIG. 10 is a representation of an alternative composite image arrangement.

The visible elements of some icon images are such that the appearance of the logo is improved if the text component overlaps the image area to some extent. Horizontal spacing Sh can be assigned a negative value to allow for an overlapping horizontal configuration. For example, referring to FIG. 10, the size and shape of the visible checkmark 1004 leaves the transparent lower right portion of icon image area 1002 empty of visible content. In this situation, placing text 1006 outside of image 1002, such as shown in FIG. 7C, could result in the text appearing to the user to be excessively separated from checkmark 1004. Overlapping the text container and the image results in a more aesthetically pleasing logo.

While an exemplary embodiment of the invention has been discussed, the described embodiment is to be considered as illustrative rather than restrictive. The scope of the invention is as indicated in the following claims and all equivalent methods and systems.

What is claimed is:

1. A computer implemented method for creating a composite image for incorporation into an image container in an electronic product design, the composite image having at least an image component and a text component, the method comprising
    determining, by one or more processors, a first composite image aspect ratio of a first composite image, the first composite image comprising the image component and the text component arranged in a first arrangement,
    determining, by one or more processors, a second composite image aspect ratio of a second composite image, the second composite image comprising the image component and the text component arranged in a second arrangement different than the first arrangement,
    obtaining, by one or more processors, an image container aspect ratio of the image container in the electronic product design;
    calculating, by one or more processors, a resizing of the first composite image such that, if placed in the image container, the resized first composite image fills the image container in at least one dimension;
    calculating, by one or more processors, a resizing of the second composite image such that, if placed in the image container, the resized second composite image fills the image container in at least one dimension;
    comparing, by one or more processors, respective sizes of at least one of the text component and image component in each of the resized first composite image and the resized second composite image;
    identifying, by one or more processors, based on the comparing step, the one of the first composite image and the second composite image having a larger sized text component and a larger sized image component.

2. The method of claim 1 further comprising automatically incorporating, by one or more processors, the identified composite image into the image container in the electronic product design.

3. The method of claim 1 further comprising displaying, by one or more processors, the identified composite image on a user's display.

4. The method of claim 1 wherein positioning of the image component and the text component relative to each other in each of the first composite image and the second composite image is controlled by a respective spacing parameters.

5. The method of claim 4 wherein the respective spacing parameters respectively determine a spacing distance separating the image component and the text component in each of the first composite image and the second composite image.

6. The method of claim 5 wherein the spacing distance varies in proportion to at least one of the components of the composite image.

7. The method of claim 4 wherein at least one of the respective spacing parameters causes the image component and the text component in the corresponding first composite image or second composite image to overlap by a spacing distance.

8. The method of claim 7 wherein the overlap distance varies in proportion to at least one of the image component and the text component in the corresponding first composite image or second composite image.

9. The method of claim 1 further comprising automatically retaining at least the identified composite image such that the user can access at least the identified composite image at a later time.

10. The method of claim 2 further comprising producing a printed version of the electronic product design containing the identified composite image.

11. One or more non-transitory computer readable media having embodied therein computer program code for creating a composite image for incorporation into an image container in an electronic product design, the composite image having at least an image component and a text component, the code comprising:
  code for determining a first composite image aspect ratio of a first composite image, the first composite image comprising the image component and the text component arranged in a first arrangement,
  code for determining a second composite image aspect ratio of a second composite image, the second composite image comprising the image component and the text component arranged in a second arrangement different than the first arrangement,
  code for obtaining an image container aspect ratio of the image container in the electronic product design;
  code for calculating a resizing of the first composite image such that, if placed in the image container, the resized first composite image fills the image container in at least one dimension;
  code for calculating a resizing of the second composite image such that, if placed in the image container the resized second composite image fills the image container in at least one dimension;
  code for comparing respective sizes of at least one of the text component and image component in each of the resized first composite image and the resized second composite image; and
  code for identifying, based on the comparing step, the one of the first composite image and the second composite image having a larger sized text component and a larger sized image component.

12. The computer program code of claim 11 further comprising code for incorporating the identified composite image arrangement into the image container in the electronic product design template.

13. The computer program code of claim 11 further comprising code for displaying the identified composite image to the user.

14. The computer program code of claim 11 further comprising computer program code for determining positioning of the image container and the text component relative to each other according to a respective spacing parameters.

15. The computer program code of claim 11 further comprising computer program code for automatically retaining at least the composite image such that the user can access at least the composite image at a later time.

16. A computer implemented method for identifying a composite image for use in an electronic product design having an image container, the method comprising
  retaining, by one or more processors, a plurality of composite images associated with a user, each composite image containing at least the same text component provided by the user and the same image component selected by the user and each composite image having the text component and the image component positioned within the composite image in a different arrangement such that each composite image has a different aspect ratio,
  determining, by one or more processors, the aspect ratio of the image container in the electronic product design, and
  identifying, by one or more processors, the one of the plurality of composite images that would result in the largest composite image components if that composite image is placed in the composite image container and sized so as to fill the image container in at least one dimension while maintaining the aspect ratio of the identified composite image.

17. The method of claim 16 further comprising automatically incorporating the identified composite image into the image container in the electronic product design.

18. The method of claim 16 further comprising producing a printed version of the electronic product design containing the identified composite image.

19. One or more non-transitory computer readable media having embodied therein computer program code for method for identifying a composite image for use in an electronic product design having an image container, the code comprising:
  code for retaining a plurality of composite images associated with a user, each composite image containing at least the same text component provided by the user and the same image component selected by the user and each composite image having the text component and the image component positioned within the composite image in a different arrangement such that each composite image has a different aspect ratio,
  code for determining the aspect ratio of the image container in the electronic product design, and
  code for identifying the one of the plurality of composite images that would result in the largest composite image components if that composite image is placed in the composite image container and sized so as to fill the image container in at least one dimension while maintaining the aspect ratio of the identified composite image.

20. The computer program code of claim 19 further comprising code for incorporating the identified composite image arrangement into the image container in the electronic product design template.

21. A system for creating a composite image for incorporation into an image container in an electronic product design, the composite image having at least an image component and a text component, the system comprising: one or more processors; and one or more computer readable media having embodied therein computer code which, when executed by the one or more processors, implements the method of claim 1.

22. A system for creating a composite image for incorporation into an image container in an electronic product design, the composite image having at least an image component and a text component, the system comprising: one or more processors; and one or more computer readable media having embodied therein computer code which, when executed by the one or more processors, implements the method of claim 16.

23. The method of claim 1, wherein the identified composite image fills the image container in one dimension and is centered in the image container in the other dimension.

24. The method of claim 16, wherein the identified composite image fills the image container in one dimension and is centered in the image container in the other dimension.

25. The method of claim 1, wherein the first arrangement is a vertical arrangement of the image component and the text component, and the second arrangement is a horizontal arrangement of the vertical arrangement of the image component and the text component.

26. The method of claim 1, wherein the comparing step comprises comparing, by one or more processors, the respective sizes of only one of the text component and image component in each of the resized first composite image and the resized second composite image.

27. The method of claim 1, wherein the relative dimensions of the image component and the text component and any spacing distance therebetween have fixed size relationships to each other, and each of the first composite image aspect ratio and the second composite image aspect ratio is determined based only on an aspect ratio of the text component and the fixed size relationships.

* * * * *